(12) United States Patent
Boger et al.

(10) Patent No.: US 9,205,362 B2
(45) Date of Patent: Dec. 8, 2015

(54) METHODS FOR MANUFACTURING PARTICULATE FILTERS

(75) Inventors: Thorsten Rolf Boger, Painted Post, NY (US); Todd Parrish St Clair, Painted Post, NY (US); Patrick David Tepesch, Corning, NY (US); Brian Paul Usiak, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 1036 days.

(21) Appl. No.: 13/285,379

(22) Filed: Oct. 31, 2011

(65) Prior Publication Data

US 2013/0106031 A1    May 2, 2013

(51) Int. Cl.
| | |
|---|---|
| C04B 35/64 | (2006.01) |
| B01D 46/24 | (2006.01) |
| C04B 38/00 | (2006.01) |
| B28B 11/00 | (2006.01) |
| C04B 35/478 | (2006.01) |
| C04B 35/626 | (2006.01) |
| C04B 35/636 | (2006.01) |
| C04B 111/00 | (2006.01) |

(52) U.S. Cl.
CPC .......... B01D 46/244 (2013.01); B28B 11/006 (2013.01); C04B 35/478 (2013.01); C04B 35/6264 (2013.01); C04B 35/6365 (2013.01); C04B 38/0006 (2013.01); C04B 2111/00793 (2013.01); C04B 2235/3206 (2013.01); C04B 2235/3213 (2013.01); C04B 2235/3218 (2013.01); C04B 2235/3227 (2013.01); C04B 2235/3418 (2013.01)

(58) Field of Classification Search
CPC ........................ C04B 38/006; C04B 38/0012
See application file for complete search history.

(56) References Cited

U.S. PATENT DOCUMENTS

| | | | |
|---|---|---|---|
| 5,198,007 A | 3/1993 | Moyer et al. | 55/523 |
| 6,080,345 A * | 6/2000 | Chalasani et al. | 264/109 |
| 6,840,976 B2 | 1/2005 | Vance et al. | 55/523 |
| 7,556,664 B2 | 7/2009 | Ichikawa et al. | 55/523 |
| 7,575,618 B2 * | 8/2009 | Miao et al. | 55/523 |
| 2005/0069675 A1 * | 3/2005 | Noguchi | 428/116 |
| 2008/0057234 A1 | 3/2008 | Custer et al. | 428/34.4 |
| 2009/0202402 A1 | 8/2009 | Sato | 422/180 |
| 2009/0217524 A1 * | 9/2009 | Domey et al. | 29/890 |
| 2011/0262311 A1 * | 10/2011 | Schumann | 422/177 |

FOREIGN PATENT DOCUMENTS

EP    2090351    8/2009    ............ B01D 46/24

* cited by examiner

*Primary Examiner* — Erin Snelting
(74) *Attorney, Agent, or Firm* — Charles A. Greene (57) ABSTRACT

A method of manufacturing a particulate filter includes plugging at least some of the channels of a green cellular ceramic body on a first end with a green plugging material that includes a liquid vehicle to form a partially plugged green cellular ceramic body, firing the partially plugged green cellular ceramic body to form a partially plugged ceramic article, and plugging at least some of the channels on a second end of the partially plugged ceramic article with a plugging material that sets at a temperature of less than 1000° C.

20 Claims, 7 Drawing Sheets

_METHODS FOR MANUFACTURING PARTICULATE FILTERS_

BACKGROUND

The disclosure relates generally to methods of manufacturing particulate filters and more particularly to methods of plugging and/or skinning particulate filters.

Particulate filters, such as diesel particulate filters (DPFs), are increasingly employed in pollution control systems, such as in mobile emissions applications where they are key components in most engine power train systems. Commonly used filter materials include cordierite, silicon carbide and aluminum titanate.

Particulate filters are generally made of cellular honeycomb bodies with a checkerboard plugging pattern on each side. To allow flow through the filter, the plug pattern is offset by one cell for the inlet and outlet faces. In use, particulate filters collect particulate matter, causing an increase in pressure drop across the filter. This increase in pressure drop has a negative impact on fuel economy and engine performance.

Removal of accumulated particulate matter can be accomplished via regeneration, during which engine exhaust temperatures are increased to a level in which oxidizers that are present, such as $O_2$ and $NO_2$ enable rapid oxidation of the soot. However, during regeneration, unfavorable conditions can sometimes exist, leading to an increase in the filter temperature and increased thermo-mechanical stresses. In extreme cases, the temperatures can cause melting and the stresses can cause fracturing of the filter. In the most extreme conditions, temperatures are especially severe in the vicinity of the outlet face of the filter and so special attention must be paid to the plug/matrix interface at the outlet side. An important characteristic of a particulate filter is, therefore, robustness under these extreme conditions.

Production of sufficiently robust plug/matrix interfaces has conventionally involved firing green plugs to a previously fired matrix material thereby involving a second firing of the matrix material. However, such production involves added processing steps and expense. On the other hand, green plugging of green matrix material has generally involved drawbacks such as insufficient airflow through the part during firing due to the fact that, when green plugs are present on both ends of a green matrix material, the composite structure is insufficiently porous, especially during the initial stage of the firing process, when no significant porosity has been created. In addition, issues of the compatibility of the green plug cement with the green body have been observed.

SUMMARY

One embodiment of the disclosure relates to a method of manufacturing a particulate filter. The method includes providing a green cellular ceramic body that includes a binder material and a plurality of channels. The method also includes plugging at least some of the channels on a first end of the green cellular ceramic body with a green plugging material that includes a liquid vehicle to form a partially plugged green cellular ceramic body. In addition, the method includes firing the partially plugged green cellular ceramic body to form a partially plugged ceramic article. The method also includes plugging at least some of the channels on a second end of the partially plugged ceramic article with a plugging material that sets at a temperature of less than 1000° C.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

Various embodiments of the disclosure will be described in detail with reference to the drawings, if any.

As used herein, the term "soluble" refers to a first medium (e.g., solute) having a solubility in a second medium (e.g., solvent) of at least 0.1 mole per liter at 25° C.

As used herein, the term "insoluble" refers to a first medium (e.g., solute) having a solubility in a second medium (e.g., solvent) of less than 0.001 mole per liter at 25° C.

As used herein, the term "partially soluble" refers to a first medium (e.g., solute) having a solubility in a second medium (e.g., solvent) of at least 0.001 mole per liter but less than 0.1 mole per liter at 25° C.

For example, "the binder is insoluble in the liquid vehicle" when the binder has a solubility limit in the liquid vehicle at 25° C. of less than 0.001 mole per liter.

As used herein, the term "partially plugged", in the case of either a green cellular ceramic body or a ceramic article, means that the green cellular ceramic body or ceramic article has at least some channels plugged on a first end and less than the intended number of channels to be plugged in the final product plugged on the second end. Partially plugged green cellular ceramic bodies and partially plugged ceramic articles include those having at least some channels plugged on a first end and no channels plugged on a second end.

Figure 1:
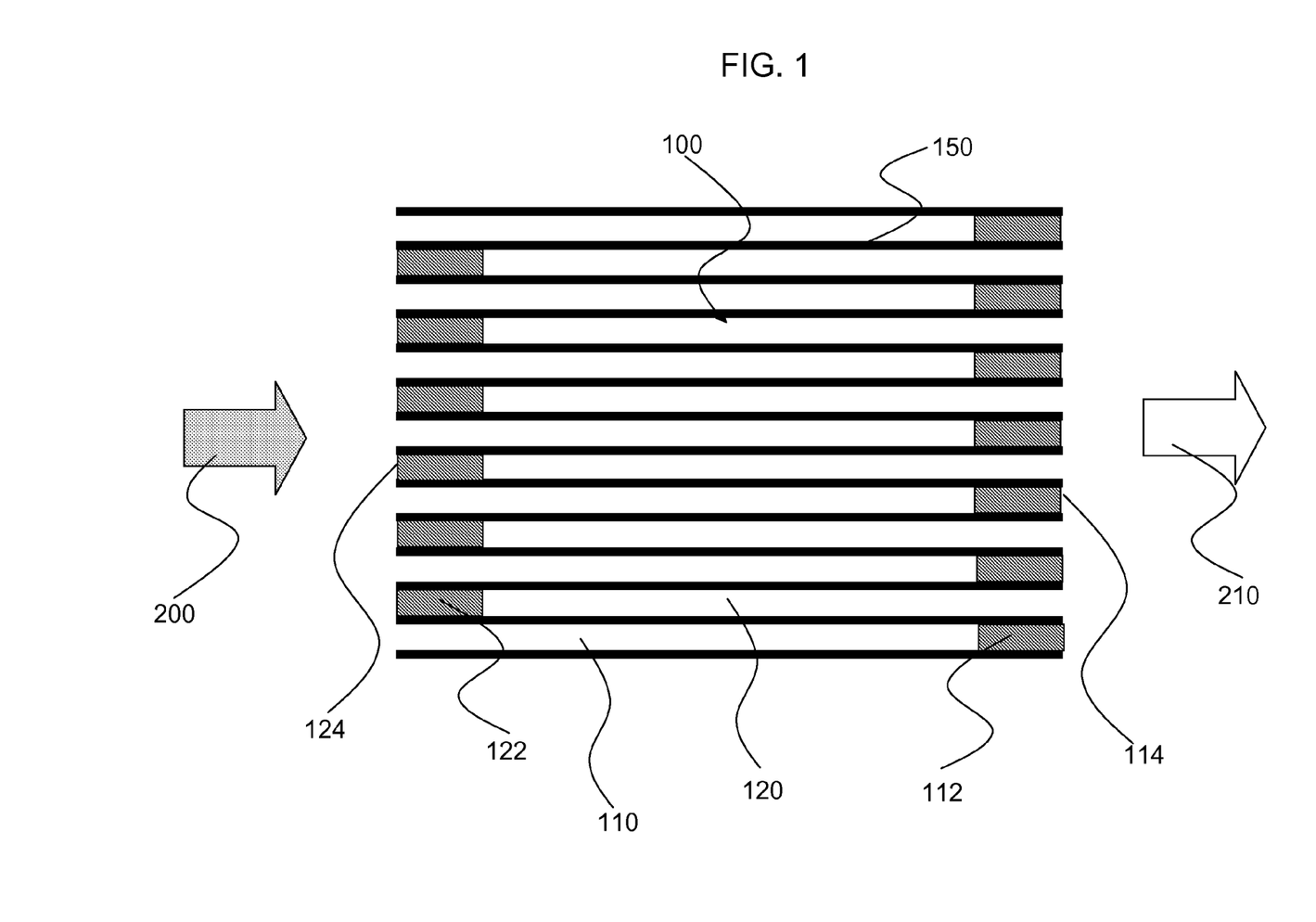
FIG. 1 illustrates a cross-sectional representation of a wall-flow filter structure.

Honeycomb structures formed from ceramic materials have a number of important uses including use as catalyst supports for controlling emissions from combustion engines and stationary pollutions sources such as power plants. They are also used as porous particulate filter bodies for the filtration of particulate-laden exhaust gases emitted by combustion engines such as diesel engines. In the latter case, the bodies are modified through the sealing or plugging of the ends of selected cells of the honeycombs to provide a manifolded "wall-flow" filter structure. A cross-sectional representation of such a "wall-flow" filter structure is shown in FIG. 1.

The fabrication of such filters typically involves plugging or otherwise sealing one end of each of the channels or cells traversing a porous ceramic honeycomb body 100, a first subset of channels or cells (i.e., "inlet channels") 110 being sealed or plugged 112 at a first or outlet end face 114 of the honeycomb and the remaining channels or cells (i.e., "outlet channels") 120 being sealed or plugged 122 at a second or opposing inlet end face 124 thereof. A particulate-contaminated fluid such as an exhaust gas 200 is supplied under pressure to the inlet face and enters the body via those cells which have an open end at the inlet end face 124. Because these cells are sealed at the opposite end face (outlet end face 114) of the body, the contaminated fluid is forced through the thin, porous walls 150 into adjoining cells which are sealed at the inlet end face 124 and open at the outlet end face 114. The solid particulate contaminant in the fluid which is too large to pass through the porous openings in the walls is left behind and a cleansed fluid 210 exits the filter body through the outlet cells for use. Most common in the case of honeycombs with square channel cross-sections is a masking design producing a checkerboard pattern of plugs in each end of the honeycombs, such that each inlet cell is surrounded on four sides by outlet cells, and vice versa.

Figure 2A:
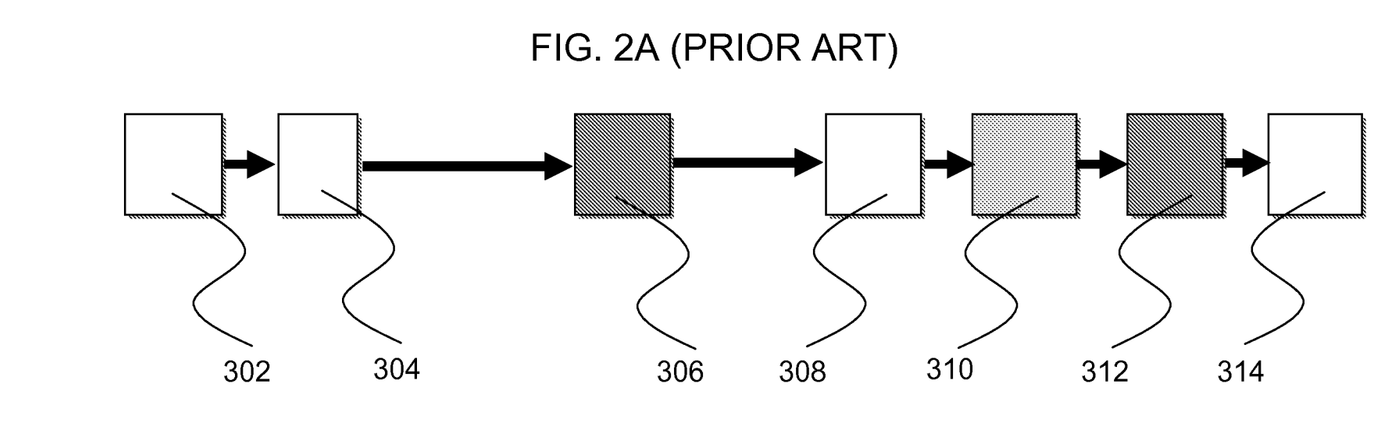
FIG. 2A shows a flow diagram of a conventional filter manufacturing process.

FIG. 2A sets forth a flow diagram of a conventional filter manufacturing process. In this process, following an extrusion step 302 and a drying step 304, an unplugged green cellular ceramic body is first fired 306 at high temperatures (e.g., above 1000° C.) to form an unplugged ceramic article. Following this first firing step, a cutting step 308 is typically performed, after which both ends of the unplugged ceramic article are plugged 310 with a plugging material, after which a second firing 312 at high temperatures (e.g., above 1000° C.) is required to adequately set the plugging material, after which the filter is subjected to a finishing 314 process.

Figure 2B:
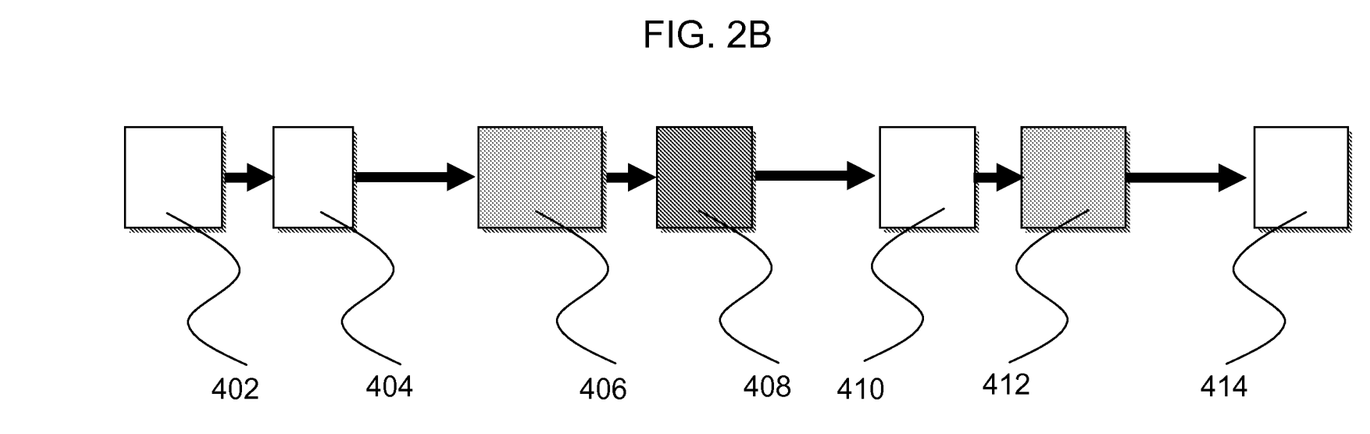
FIG. 2B shows an exemplary flow diagram of a filter manufacturing process in accordance with embodiments described herein.

FIG. 2B sets forth an exemplary flow diagram of a process in accordance with embodiments described herein. In this process, following an extrusion step 402 and a drying step 404, an unplugged green cellular ceramic body is plugged 406 on a first end with a green plugging material comprising a liquid vehicle to form a partially plugged green cellular ceramic body. The partially plugged green cellular ceramic body is then fired 408 at high temperatures (e.g., above 1000° C.) to form a partially plugged ceramic article. Next, a cutting step 410 can be performed, following which a second end of the partially plugged ceramic article is plugged 412 with a plugging material that sets at a temperature of less than 1000° C., after which the filter can be subjected to a finishing 414 process.

Figure 3A:
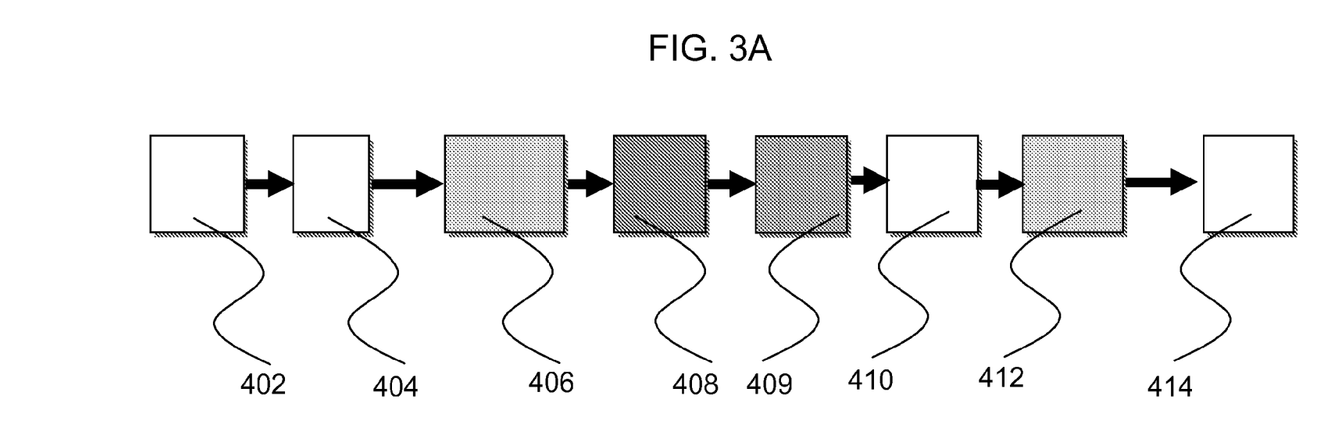
FIG. 3A shows an exemplary flow diagram of an alternative filter manufacturing process in accordance with embodiments described herein.

FIG. 3A sets forth an exemplary flow diagram of an alternative process in accordance with embodiments described herein. This process is identical to the process set forth in FIG. 2B except the partially plugged ceramic article is subjected to a passivation treatment 409.

Figure 3B:
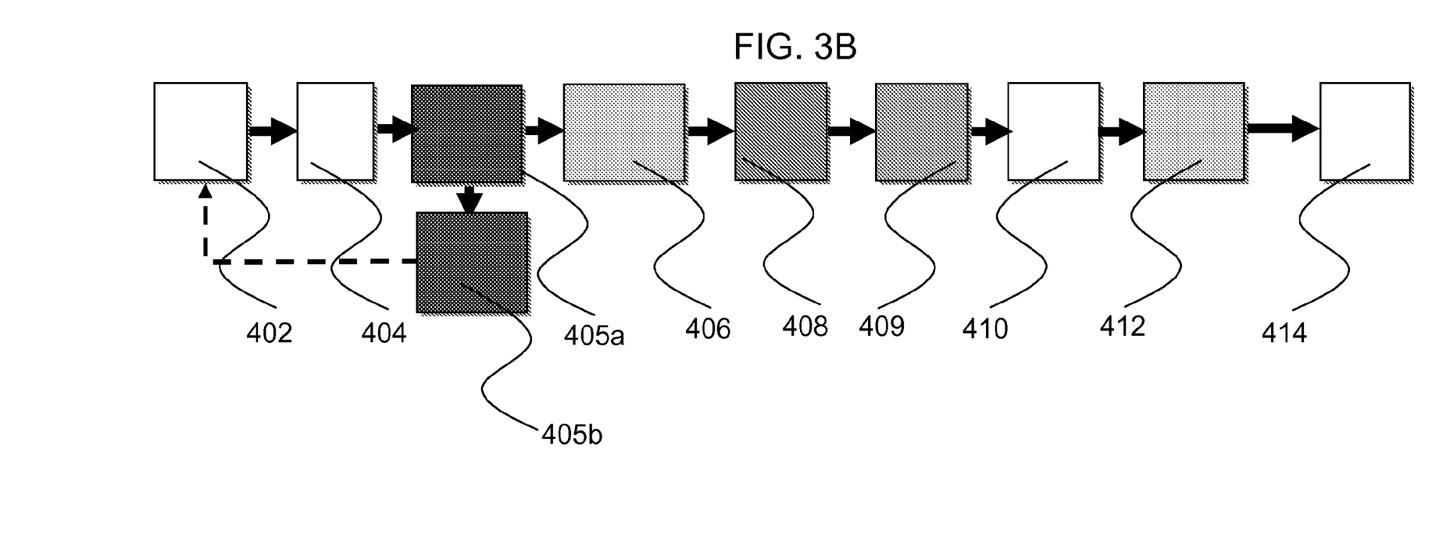
FIG. 3B shows an exemplary flow diagram of an alternative filter manufacturing process in accordance with embodiments described herein.

FIG. 3B sets forth an exemplary flow diagram of another alternative process in accordance with embodiments described herein. This process is identical to the process set forth in FIG. 3A, except prior to plugging a first end of a green cellular ceramic body 406, a radially outermost area of the green cellular ceramic body is contoured in accordance with a predetermined dimensional specification and a green skin material is applied to the radially outermost area of the green cellular ceramic body 405a. In this embodiment, prior to the contouring step, green cellular ceramic bodies can be extruded to a size slightly larger than desired but in a manner that enables high web quality, even if the webs are thin. This can enable tight dimensional control without special demand or attention during the initial forming process. The green skin material applied after the contouring step can be the same or different than green cellular ceramic body and can also be the same or different than the green plugging material. Material removed as a result of contouring a radially outermost area of the green cellular ceramic body can recycled 405b to provide material for providing other green cellular ceramic bodies.

Figure 4A:
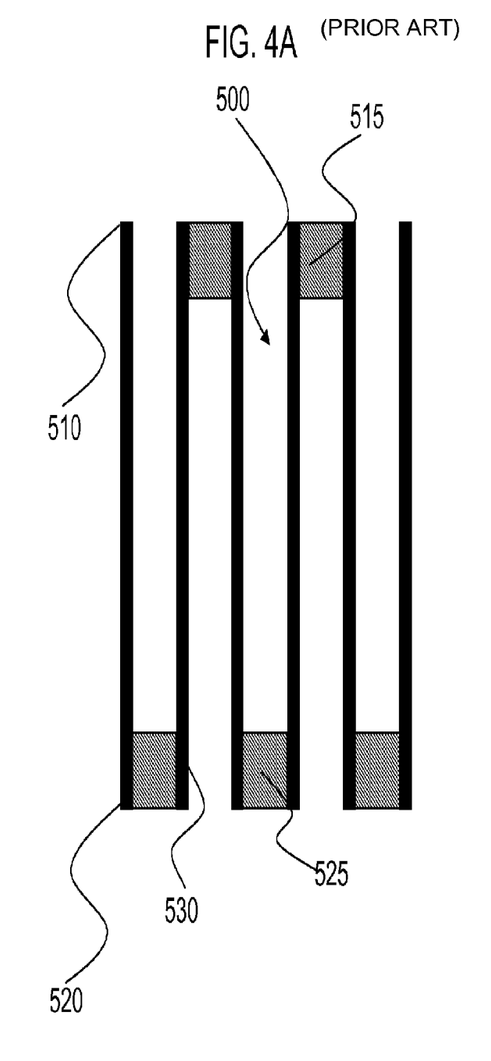
FIG. 4A illustrates a cross-sectional representation of a fully plugged green cellular ceramic body being subjected to firing according to a prior art green plugging process.

FIG. 4A illustrates a cross-sectional representation of a fully plugged green cellular ceramic body 500 being subjected to firing according to a prior art green plugging process. Fully plugged green cellular ceramic body 500 has an inlet end 510 and an outlet end 520, inlet end green plugs 515 and outlet end green plugs 525, and green walls 530. In the green state and at least early stages of firing, the plugs and walls have not developed sufficient porosity to allow for substantial gas flow through the part, since walls and plugs are predominately non-porous until pore former burnout. This can lead to poor heat transfer and temperature distribution, which can result in cracking of the part due to differences in the local temperature and thermal expansion as well as different local residence times at given temperatures, which can lead to non-uniform physical properties in the finished article.

Figure 4B:
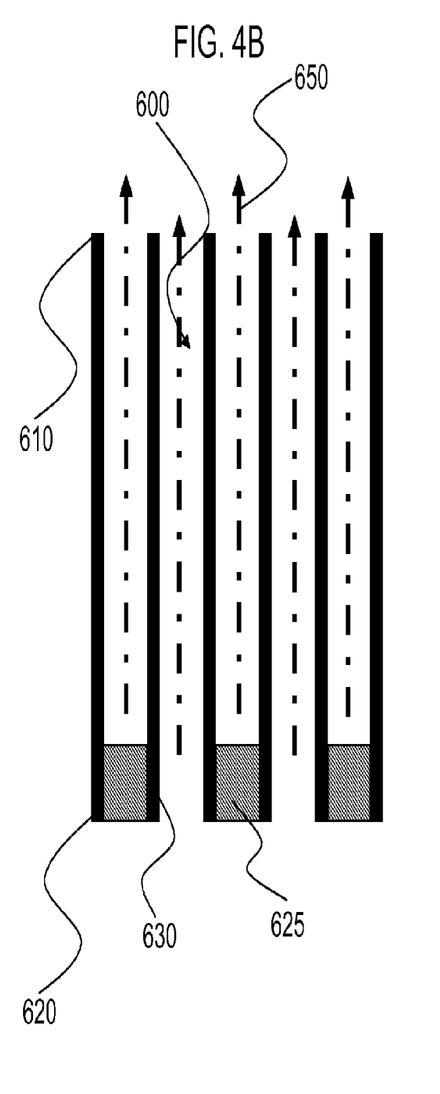
FIG. 4B illustrates a cross-sectional representation of an exemplary partially plugged green cellular ceramic body being subjected to firing according to embodiments described herein.

FIG. 4B illustrates a cross-sectional representation of an exemplary partially plugged green cellular ceramic body 600 being subjected to firing according to embodiments described herein. Partially plugged green cellular ceramic body 600 has an inlet end 610 and an outlet end 620, outlet end green plugs 625, and green walls 630. Partially plugged ceramic body is unplugged at its inlet end 610. Because partially plugged green cellular ceramic body is unplugged at its inlet end 610, gas 650 can flow through the part during firing, resulting in improved heat transfer and temperature distribution.

In embodiments disclosed herein, the green cellular ceramic body can include at least one material that upon firing reacts to form at least one material selected from the group consisting of aluminum titanate (AT), metals, intermetallics, mullite, cordierite, alumina ($Al_2O_3$), silicon carbide (SiC), silicon nitride ($Si_3N_4$), silicon aluminum oxynitride (SiAlON), and zeolites.

Such at least one material can include one or more inorganic ceramic-forming ingredients. The inorganic ceramic-forming ingredients may be synthetically produced materials such as oxides, hydroxides, etc., or they may be naturally occurring minerals such as clays, talcs, or any combination of these. Embodiments disclosed herein are not limited to the types of powders or raw materials. These may be chosen depending on the properties desired in the ceramic body.

In one set of exemplary embodiments, the inorganic ceramic-forming ingredients may yield an aluminum-titanate (AT) ceramic material upon firing. In other exemplary embodiments, the inorganic ceramic-forming ingredients may be those that yield cordierite, mullite, or mixtures of these on firing, some examples of such mixtures being about 2% to about 60% mullite, and about 30% to about 97% cordierite, with allowance for other phases, typically up to about 10% by weight.

One composition, by way of a non-limiting example, which ultimately forms cordierite upon firing is as follows in percent by weight: about 33-41, such as about 34-40 of aluminum oxide, about 46-53 such as about 48-52 of silica, and about 11-17 such as about 12-16 magnesium oxide.

The green cellular ceramic body also includes at least one binder material. In certain exemplary embodiments, the at least one binder material is soluble in water. The at least one binder material can be selected from, for example, cellulose-based polymers, including cellulose ethers. Exemplary cellulose ethers include methylcellulose and hydroxypropyl methylcellulose (HPMC).

In certain exemplary embodiments, the binder can be present in a ceramic precursor batch composition used for making green cellular ceramic bodies in an amount of at least 1.0% on a weight percent by super addition basis, such as an amount ranging from about 1.0% to about 6.0% on a weight percent by super addition basis, and further such as an amount ranging from about 2.0% to about 5.0%, on a weight percent by super addition basis.

In certain exemplary embodiments, ceramic precursor batch compositions used for making green cellular ceramic bodies can also include at least one solvent. The solvent may provide a medium for the binder to dissolve in thus providing plasticity to the ceramic precursor batch and wetting of the powders. The solvent may be aqueous based such as, but not limited to, water or water-miscible solvents. Most useful may be aqueous based solvents which provide hydration of the binder and powder particles. In certain exemplary embodiments, the amount of aqueous solvent may be from about 18% by weight to about 50% by weight, on a weight percent by super addition basis.

In certain exemplary embodiments, ceramic precursor batch compositions used for making green cellular ceramic bodies may further comprise other additives such as surfactants, oil lubricants and pore-forming material. Non-limiting examples of surfactants that may be used in certain exemplary embodiments include $C_8$ to $C_{22}$ fatty acids and/or their salts or derivatives. Additional surfactant components that may be used with these fatty acids include $C_8$ to $C_{22}$ fatty esters, $C_8$ to $C_{22}$ fatty alcohols, and combinations of these. Exemplary surfactants include stearic, lauric, oleic, linoleic, palmitoleic acids, and their derivatives, stearic acid in combination with ammonium lauryl sulfate, and combinations of all of these. In an illustrative embodiment, the surfactant may be lauric acid, stearic acid, oleic acid, and combinations of these. In certain exemplary embodiments, the amount of surfactants may be from about 0.25% by weight to about 2% by weight, on a weight percent by super addition basis.

Non-limiting examples of oil lubricants may be light mineral oil, corn oil, high molecular weight polybutenes, polyol esters, a blend of light mineral oil and wax emulsion, a blend of paraffin wax in corn oil, and combinations of these. In certain exemplary embodiments, the amount of oil lubricants may be from about 1% by weight to about 10% by weight, on a weight percent by super addition basis. In an exemplary embodiment, the oil lubricants may be present from about 3% by weight to about 6% by weight, on a weight percent by super addition basis.

In certain exemplary embodiments, it may be desirable to include a pore forming material in the mixture in an amount effective to subsequently obtain the porosity required for efficient filtering. Examples of pore forming materials include particulate substances (not binders) that burn out of the green body in the firing step. Other pore forming materials do not burn out in the firing step. Some types of pore forming materials that may be used, although it is to be understood that embodiments herein are not limited to these, include non-waxy organics that are solid at room temperature, elemental carbon, and combinations of these. Some examples may be graphite, starch, cellulose, flour, etc. In one exemplary embodiment, the pore forming material may be elemental carbon. For example, the pore forming material may be graphite, which may have the least adverse effect on the processing. In an extrusion process, for example, the rheology of the mixture may be favorable when graphite is used. The pore forming material may be up to about 60% by weight as a superaddition. Typically, the amount of graphite may be from about 1% to about 50%, such as from about 3% to about 30% by weight based on the inorganic ceramic-forming ingredients. If a combination of graphite and flour are used, the amount of pore forming material may be typically from about 1% by weight to about 25% by weight with the graphite at 5% by weight to 10% of each and the flour at 5% by weight to about 10% by weight.

The disclosure also provides a method of producing a ceramic honeycomb body, comprising the steps of compounding inorganic ceramic-forming ingredients and a binder, among other ingredients. The ingredients may be mixed, for example, in a muller or plow blade mixer. A solvent may be added in an amount that is less than is needed to plasticize the batch. With water as the solvent, the water hydrates the binder and the powder particles. The surfactant and/or oil lubricant, if desired, may then be added to the mix to wet out the binder and powder particles.

The precursor batch may then be plasticized by shearing the wet mix formed above in any suitable mixer in which the batch will be plasticized, such as, but not limited to, a twin-screw extruder/mixer, auger mixer, muller mixer, or double arm, etc. Extent of plasticization is dependent on the concentration of the components (binder, solvent, surfactant, oil lubricant and the inorganics), temperature of the components, the amount of work put in to the batch, the shear rate, and extrusion velocity. During plasticization, the binder dissolves in the solvent and a high viscosity fluid phase is formed. The binder formed is stiff because the system is very solvent-deficient. The surfactant enables the binder phase to adhere to the powder particles.

In a further step, the composition may be extruded to form a green honeycomb body. Extrusion may be done with devices that provide low to moderate shear. For example hydraulic ram extrusion press or two stage de-airing single auger are low shear devices. A single or twin screw extruder is a moderate shear device. The extrusion may be vertical or horizontal.

It will be appreciated that honeycomb bodies disclosed herein may have any convenient size and shape and the disclosed embodiments are applicable to all processes in which plastic powder mixtures are shaped. The process may be especially suited to production of cellular monolith bodies such as honeycombs. Cellular bodies find use in a number of applications such as catalytic, adsorption, electrically heated catalysts, filters such as diesel particulate filters, molten metal filters, regenerator cores, etc.

In certain exemplary embodiments, honeycomb densities can range from about 235 cells/cm$^2$ (1500 cells/in$^2$) to about 15 cells/cm$^2$ (100 cells/in$^2$). Typical wall thicknesses may be from about 0.05 to about 0.6 mm (about 2 to about 25 mils), including from about 0.12 to 0.38 mm (about 5 to about 15 mils).

The extrudates may then be dried according to known techniques, so as to produce green cellular ceramic bodies. Following drying, at least some of the channels on a first end of the green cellular ceramic body can be plugged with a green plugging material to form a partially plugged green cellular ceramic body.

In certain exemplary embodiments, the first end corresponds to the fluid outlet side of the filter. A second end of the filter corresponds to the fluid inlet side. In certain exemplary embodiments, the second end remains unplugged until after the partially plugged green cellular ceramic body has been fired.

The green plugging material includes a liquid vehicle. In certain exemplary embodiments, the binder material in the green cellular ceramic bodies is insoluble in the liquid vehicle in the green plugging material. In certain exemplary embodiments, the binder material in the green cellular ceramic bodies is partially soluble in the liquid vehicle in the green plugging material.

In certain exemplary embodiments, the liquid vehicle is insoluble in water. In certain exemplary embodiments, the green plugging material comprises at least 10 wt % of the liquid vehicle. In certain exemplary embodiments, the green plugging material comprises less than 5 wt % water or a water soluble solvent, such as less than 1 wt % water or a water soluble solvent. In certain exemplary embodiment, the green plugging material comprises essentially no water or a water soluble solvent.

In certain exemplary embodiments, the liquid vehicle can include or be selected from at least one component selected from the group consisting of oils, water insoluble fatty acids, water insoluble alcohols, water insoluble ethers, water insoluble esters, water insoluble aldehydes, and water insoluble ketones. Examples of liquid vehicle constituents include those containing substituted or unsubstituted, linear or branched, and saturated or unsaturated aliphatic chains, such as those having at least 8 carbon atoms. Liquid vehicle constituents may also contain aromatic groups or substituents.

In exemplary embodiments disclosed herein, the green plugging material can include at least one material that upon firing reacts to form at least one material selected from the group consisting of aluminum titanate (AT), metals, intermetallics, mullite, cordierite, alumina ($Al_2O_3$), silicon carbide (SiC), silicon nitride ($Si_3N_4$), silicon aluminum oxynitride (SiAlON), and zeolites.

Such at least one material can include one or more inorganic ceramic-forming ingredients. The inorganic ceramic-forming ingredients may be the same or different as the inorganic ceramic-forming ingredients used to make green cellular ceramic bodies disclosed herein. Such materials can include synthetically produced materials such as oxides, hydroxides, etc., or they may be naturally occurring minerals such as clays, talcs, or any combination of these. Embodiments disclosed herein are not limited to the types of powders or raw materials. These may be chosen depending on the properties desired in the plugs.

In certain exemplary embodiments disclosed herein, the green plugging material can react upon firing to form the same general type of material as the type of material the green cellular ceramic body forms as a result of firing. For example, in certain exemplary embodiments, both the green plugging material and the green cellular ceramic body can form aluminum titanate (AT) as a result of firing. Alternatively, both the green plugging material and the green cellular ceramic body can form cordierite as a result of firing.

In other exemplary embodiments, the green plugging material and the green cellular ceramic body can form a different general type of material as a result of firing. For example, the green cellular ceramic body may form aluminum titanate (AT) as a result of firing, whereas the green plugging material may form cordierite as a result of firing.

The partially plugged green cellular ceramic bodies may then be fired. The firing conditions of temperature and time may depend on the composition and size and geometry of the body, and embodiments herein are not limited to specific firing temperatures and times. For example, in compositions which are primarily for forming cordierite, the temperatures may be from about 1300° C. to about 1450° C., and the holding times at these temperatures may be from about 1 hour to about 10 hours. For mixtures that are primarily for forming mullite, the temperatures may be from about 1300° C. to about 1650° C., and the holding times at these temperatures may be from about 1 hour to about 24 hours. For cordierite-mullite forming mixtures which yield the previously described cordierite-mullite compositions, the temperatures may be from about 1300° C. to about 1650° C. For mixtures that are primarily for forming aluminum titanate (AT), the temperatures may be from about 1350° C. to about 1500° C. and the holding times at these temperatures may be from about 5 hours to about 24 hours. Firing times depend on factors such as kinds and amounts of materials and nature of equipment but typical total firing times may be from about 20 hours to about 250 hours. For metal bodies, the temperatures may be about 1000° C. to 1400° C. in a reducing atmosphere preferably hydrogen. Firing times depend on factors as discussed above but may be at least 2 hours. For zeolite bodies, the temperatures may be about 400° C. to 1000° C. in air. Firing times depend on factors as discussed above but may be at least 2 hours.

After firing, the partially plugged ceramic articles may be subjected to a cutting step. Subsequently, at least some of the channels on a second end of the partially plugged ceramic articles can be plugged with a plugging material.

In embodiments disclosed herein, the plugging material sets at a temperature of less than 1000° C., such as a temperature of less than 500° C., and further such as a temperature of less than 200° C.

In certain exemplary embodiments, the plugging material sets at a temperature ranging from about 0 to 200° C. such as from about 25 to 150° C. Such plugging material can include "cold set" plugs as well as plugs that are heat-cured ("warm set") at a temperature below the sintering temperature used in firing the partially plugged green cellular ceramic bodies to form partially plugged ceramic articles.

In cold-set plugging, only drying of the plugging mixture is required to form a seal with the channel walls of the honeycombs. While not necessarily required, heating of the plugged honeycombs to temperatures in the 35 to 110° C. range can be useful to accelerate drying. In some cold-set plugging processes it is anticipated that final plug consolidation, including the removal of residual temporary binder by-products and strengthening of the seals, can even occur during the course of subsequent processing of the filter (in the course of catalyzation or canning) or during first use of the filter in an exhaust system.

While not limited to any specific composition, in certain exemplary embodiments, the plugging material includes a ceramic powder, a permanent inorganic bonding agent, a liquid vehicle, and a liquid vehicle-soluble temporary binder.

In certain exemplary embodiments, the ceramic power can be a pre-reacted amorphous or crystalline ceramic powder that is not significantly changed in composition or structure at plug curing or filter use temperatures. This avoids the need to use high curing temperatures to chemically react the plug constituents. The ceramic powder can, for example, include at least one powder selected from the group consisting of aluminum titanate (AT), cordierite, mullite, alumina, silica (including fused or amorphous silica), silicon carbide (SiC), and silicon nitride ($Si_3N_4$).

In certain exemplary embodiments, the permanent inorganic bonding agent is selected from those that are easily and thoroughly dispersible in the plugging mixtures such that they can provide both effective consolidation of the ceramic powder and good sealing to the channel walls of the ceramic honeycomb structure. The permanent inorganic bonding agent can, for example, include or be derived from a colloidal or finely divided silica or silicate. By finely divided silica is meant silica having a maximum average particle size not exceeding about 0.5 micrometers. Examples of suitable silica or silicate materials for use as bonding agents include silica sols and powdered silica or silicate glasses. Additional examples include other metal oxide colloidal particles, such as alumina, titania, and zirconia.

In certain exemplary embodiments, the liquid vehicle includes at least one of water and a water soluble liquid. When the liquid vehicle includes at least one of water and a water soluble liquid, the liquid vehicle-soluble temporary binder include water soluble cellulosic binders, including cellulose derivatives such as cellulose ethers. Particular examples include methyl cellulose and hydroxypropyl methyl cellulose.

In certain exemplary embodiments, the plugging material may additionally include minor additions of other components for purposes such as improving temporary binder effectiveness or modifying the plasticity or lubricity of the mixture to improve its compatibility with other plugging processes. Examples of suitable optional additives include plasticizing agents such as the polyvinyl butyral resin plasticizers and lubricating agents such as mineral oils.

In certain exemplary embodiments, the relative proportions of the ceramic powder and permanent inorganic bonding agent in the plugging material can vary depending upon the selection of the ceramic powder and the processing to be employed to consolidate such into unitary plugs and seal the plugs to the channel walls of the filter. The weight ratio of bonding agent to ceramic powder may, for example be from about 1:20 to about 2:3. Lower proportions of the bonding agent can result in inadequate plug consolidation or poor sealing to the channel walls, while excessive bonding agent additions can decrease plug refractoriness as well as reduce physical and chemical plug compatibility with porous ceramic channel walls.

In embodiments where heat-curing of the plugging material is to be employed, curing temperatures will generally range from those temperatures at least effective to remove temporary binders and optional organic lubricants and plasticizers, to higher curing temperatures at which activation of the bonding agent to consolidate the ceramic powder and seal the unitary plugs to the channel walls of the honeycombs can be completed.

The disclosure and scope of the appended claims will be further clarified by the following examples.

EXAMPLE 1

A green aluminum titanate (AT) cellular ceramic body was provided having an outer diameter of about 6.44 inch, a wall thickness of 13 mils (1 mil=1/1000 inch), and 300 cells per square inch (CPSI). The green AT cellular ceramic body was plugged as described below with a green AT plugging material. The ranges of materials for the inorganic package for the cellular ceramic body and the green plugging material are set forth in Table 1.

TABLE 1

| Inorganic Ingredient | Amount (wt %) |
| --- | --- |
| Alumina | 45-50 |
| Titania | 25-30 |
| Silica | 8-12 |
| Strontium carbonate | 5-10 |
| Hydrated Alumina | 2-5 |
| Calcium carbonate | 1-2 |
| Lanthanum oxide | 0-1 |

The precursor batch composition for the cellular ceramic body also contained the ranges of materials for superadded ingredients as set forth in Table 2:

TABLE 2

| Superadded Ingredients in ceramic body | Amount (wt % in superaddition basis) |
| --- | --- |
| Graphite | 5-15 |
| Starch | 5-15 |
| HPMC (binder) | 3-6 |
| Water | 10-20 |
| Oil | 0-5 |

The precursor batch composition for the green plugging material contained the ranges of materials for superadded ingredients as set forth in Table 3:

TABLE 3

| Superadded Ingredients in green plugging material | Amount (wt % in superaddition basis) |
| --- | --- |
| Starch | 5-15 |
| Graphite | 5-15 |
| Tall oil (liquid vehicle) | 10-20 |

The ingredients for the green plugging material were combined and the paste was mixed until it had a cake frosting consistency. The green AT cellular ceramic body was masked and placed on a pre-determined number of washers having selectable thickness by varying the washer thickness and number in a stack, enabling plug lengths having varying lengths. Masking tape was then wrapped around the bottom of each end and the pastes were applied to the ends with the masking tape serving as a well. The body was then put onto a hydraulic press with two stainless steel plates sandwiching the ends of the green substrate and pressure was applied, forcing the paste into the unmasked channels. The pressure was released and the plates and tape were removed. The masks were then removed from the end of the sample and the sample was allowed to air dry until firing. The sample was then fired using a standard AT firing cycle.

Figure 5:
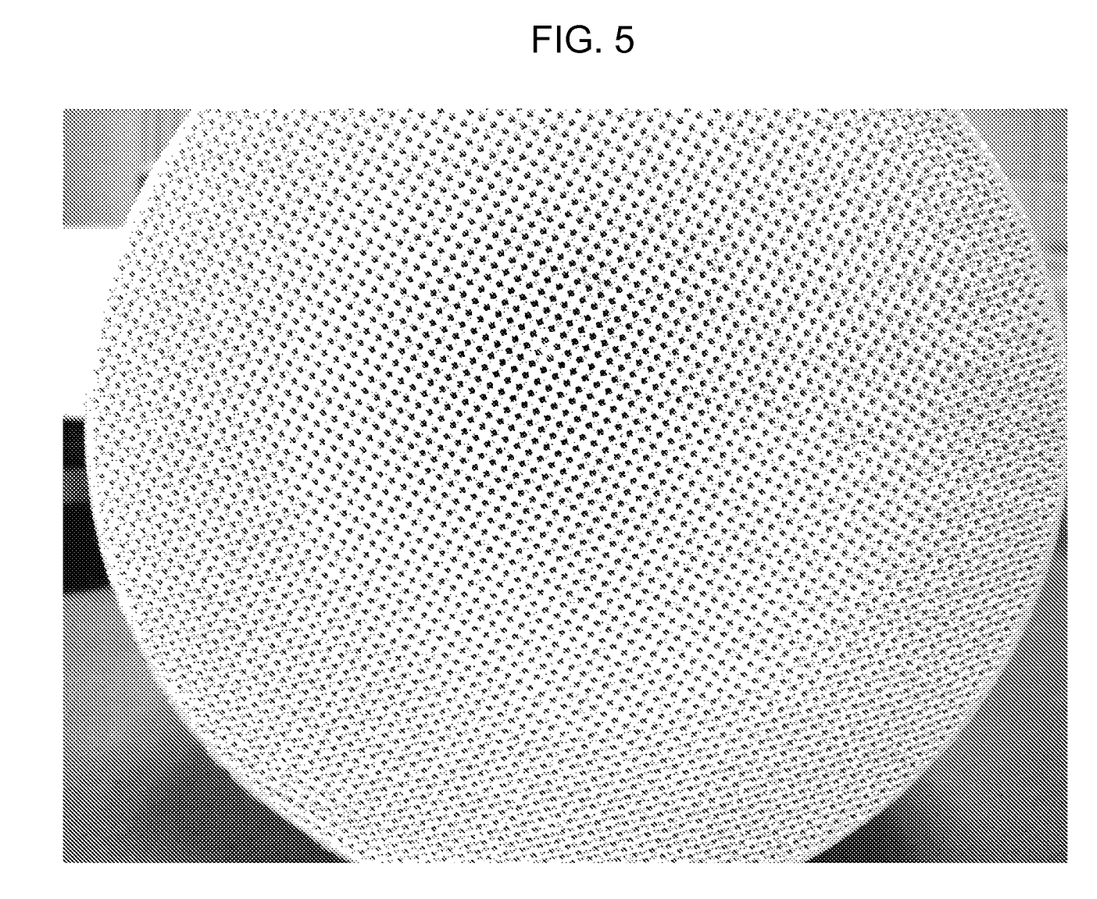
FIG. 5 shows an image of an exemplary filter outlet face subsequent to firing.

FIG. 5 shows an image of the outlet face of the sample subsequent to firing, wherein inlet channels have been plugged with the green plugging material described above prior to firing.

Figure 6:
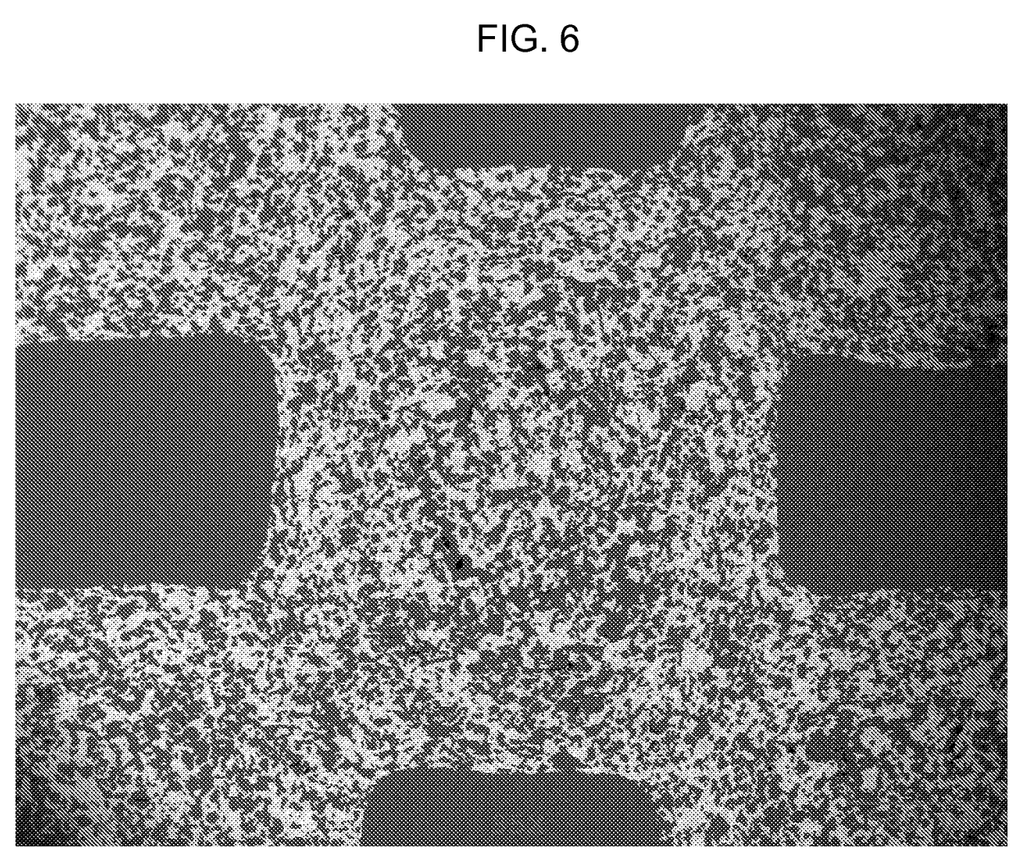
FIG. 6 shows a SEM image of an exemplary green plug after firing.

FIG. 6 shows a SEM image of a green plug after firing, showing good bonding between the plug and the wall.

Table 4 sets forth the change in outer diameter of plugged and unplugged ends of two samples before and after firing using the processing steps described above. For both samples, the percent change was positive, indicating expansion, with similar amounts of expansion for both the plugged and unplugged ends.

TABLE 4

| | Unplugged End | | Plugged End | |
|---|---|---|---|---|
| Sample no. | 1 | 2 | 1 | 2 |
| Change in diameter from green to fired (%) | 1.17 | 1.03 | 1.11 | 1.07 |

Figure 7:
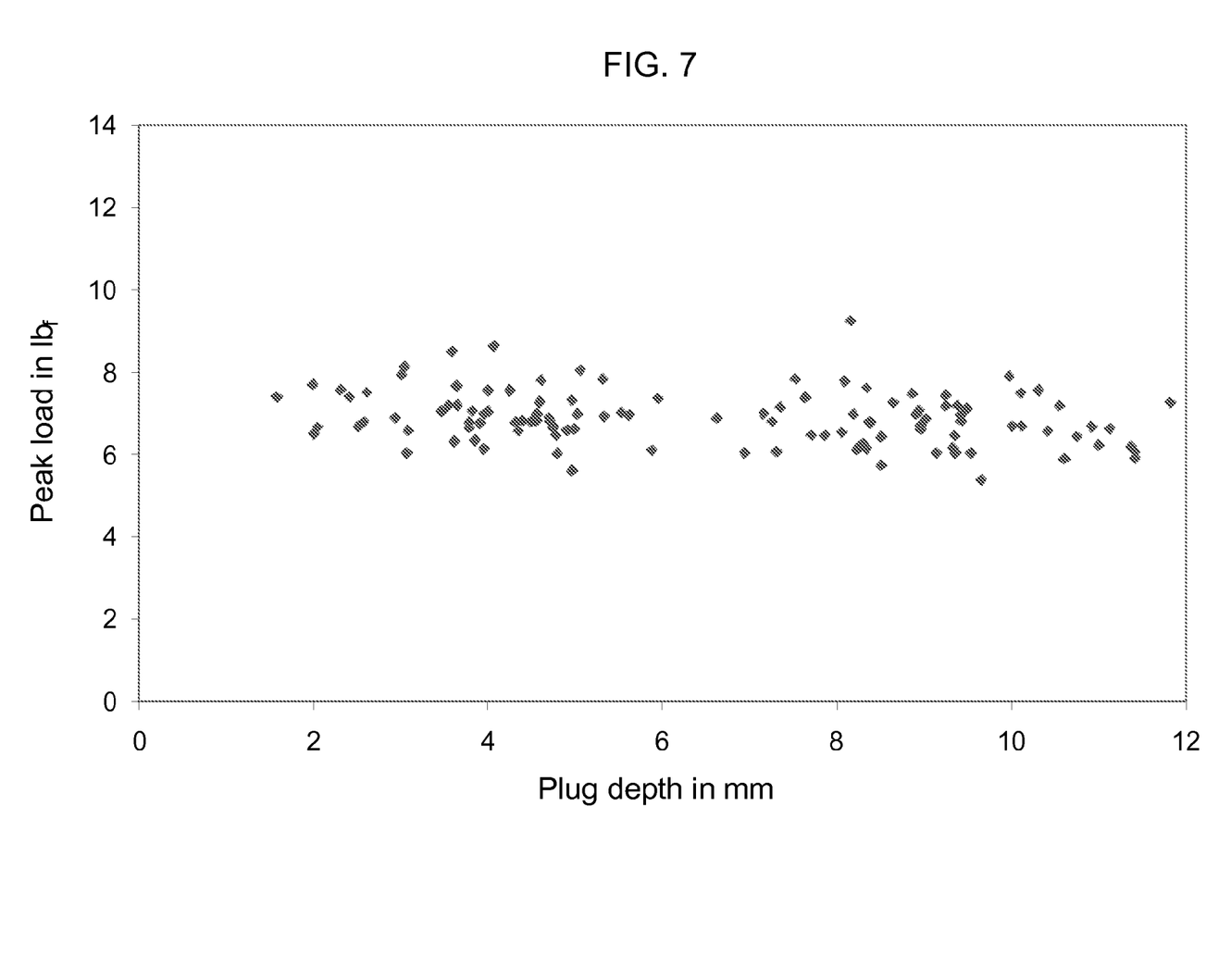
FIG. 7 plots plug push-out peak load as a function of fired plug length for a plurality of plugs in accordance with embodiments described herein.

FIG. 7 plots plug push-out peak load as a function of fired plug length. For this experiment, six AT green cookies were green plugged with the green plugging composition described above using various shim thicknesses to generate a range of plug depths. After firing, plug depths were measured for 20 plugs from each cookie and the measured plugs were masked for testing. As shown in FIG. 7, peak plug push out load is essentially independent of plug length, demonstrating that even the shortest of green plugs (down to about 2 millimeters) are at least as strong as the matrix. Furthermore, the push-out failures all occurred in the matrix as judged from post-test observations, another indication that bonding at the plug-wall interface is excellent. Accordingly, shorter plugs may be enabled using the green plugging processes described herein.

Exemplary embodiments disclosed herein can enable processes that eliminate the need of using a second firing cycle to manufacture particulate filters. Such processes can include green plugging at a first end and plugging with a plugging material that sets at a temperature of less than 1000° C., such as cold set or warm set plugs, at a second end. When the first end is green plugged and the second end is unplugged upon firing, such processes can enable air flow through the part during firing. In certain exemplary embodiments of such processes, the first end, having green plugs, corresponds to the fluid outlet side and the second end, having, for example, cold or warm set plugs, corresponds to the inlet side of the filter. This can enable the plugs at both the fluid inlet and outlet sides of the filter to have sufficient thermal and mechanical stability for the environments they are likely to face when the filter is put into use.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention as set forth in the appended claims. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A method of manufacturing a particulate filter, the method comprising:

provichannels that run between the first and second ends;

plugging at least some of the channels only at the first end of the green cellular ceramic body with a green plugging material comprising a liquid vehicle to form a partially plugged green cellular ceramic body, firing the partially plugged green cellular ceramic body to form a partially plugged ceramic article; and after said firing, plugging at least some of the channels on the second end of the partially plugged ceramic article with a plugging material that sets at a temperature of less than 1000° C., wherein the binder of the green cellular ceramic body is insoluble in the green plugging material.

2. The method of claim 1, wherein the first end corresponds to a fluid outlet side of the filter and the second end corresponds to a fluid inlet side of the filter.

3. The method of claim 1, wherein the green cellular ceramic body comprises at least one material that upon firing reacts to form at least one material selected from the group consisting of aluminum titanate (AT), metals, intermetallics, mullite, cordierite, alumina ($Al_2O_3$), silicon carbide (SiC), silicon nitride ($Si_3N_4$), silicon aluminum oxynitride (SiAlON), and zeolites.

4. The method of claim 1, wherein the green cellular ceramic body comprises at least one material that reacts upon firing to form aluminum titanate (AT).

5. The method of claim 1, wherein the method further comprises:

contouring a radially outermost area of the green cellular ceramic body in accordance with a predetermined dimensional specification; and applying a green skin material to the radially outermost area of the green cellular ceramic body.

6. The method of claim 5, wherein material removed as a result of contouring a radially outermost area of the green cellular ceramic body is recycled to provide material for providing other green cellular ceramic bodies.

7. The method of claim 1, wherein the binder material is soluble in water.

8. The method of claim 1, wherein the liquid vehicle is insoluble in water.

9. The method of claim 8, wherein the green plugging material comprises at least 10 wt % of the liquid vehicle.

10. The method of claim 1, wherein the binder material comprises a cellulose ether.

11. The method of claim 1, wherein the liquid vehicle comprises at least one component selected from the group consisting of oils, water insoluble fatty acids, water insoluble alcohols, water insoluble ethers, water insoluble esters, water insoluble aldehydes, and water insoluble ketones.

12. The method of claim 1, wherein the plugging material sets at a temperature of less than 500° C.

13. The method of claim 1, wherein the plugging material sets at temperature of less than 200° C.

14. The method of claim 1, wherein the plugging material comprises a ceramic powder, a permanent inorganic bonding agent, a liquid vehicle, and a liquid vehicle-soluble temporary binder.

15. The method of claim 14, wherein the ceramic powder comprises at least one powder selected from the group consisting of aluminum titanate (AT), cordierite, mullite, alumina, silica, silicon carbide (SiC), and silicon nitride ($Si_3N_4$), the permanent inorganic bonding agent comprises or is derived from a colloidal or finely divided silica or silicate, the liquid vehicle comprises water, and the binder comprises a cellulose ether.

16. The method of claim 1, wherein the green plugging material comprises at least one material that upon firing reacts to form at least one material selected from the group consisting of aluminum titanate (AT), metals, intermetallics, mullite, cordierite, alumina ($Al_2O_3$), silicon carbide (SiC), silicon nitride ($Si_3N_4$), silicon aluminum oxynitride (SiAlON), and zeolites.

17. The method of claim 1, wherein the green plugging material comprises less than 5 wt % water.

18. The method of claim 1, wherein the green plugging material comprises less than 1 wt % water.

19. The method of claim 1, wherein the partially plugged ceramic article is subjected to a passivation treatment.

20. The method of claim 1, wherein the binder of the green cellular ceramic body is insoluble in the liquid vehicle of the green plugging material.

\* \* \* \* \*